US006428019B1

(12) United States Patent
Kincad et al.

(10) Patent No.: US 6,428,019 B1
(45) Date of Patent: Aug. 6, 2002

(54) SEMI-ACTIVE ANTI-ROLL SYSTEM

(75) Inventors: Jeffrey Lee Kincad, Clarkston; Brian Allen Mattila, Fenton; Tom V. Ignatius, Waterford, all of MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 09/663,613

(22) Filed: Sep. 18, 2000

(51) Int. Cl.[7] .............................................. B60G 17/01
(52) U.S. Cl. ............................ 280/5.511; 280/124.106; 280/124.152
(58) Field of Search ..................... 280/5.511, 124.1, 280/124.106, 124.107, 124.149, 124.152, 5.506; 192/69.9, 85 C, 108

(56) References Cited

U.S. PATENT DOCUMENTS

| 980,508 A | 1/1911 | Gardner |
| 2,981,354 A | 4/1961 | Roller |
| 2,998,263 A | 8/1961 | Müller et al. |
| 3,086,786 A | 4/1963 | Tuczek |
| 3,820,812 A | * 6/1974 | Stubbs et al. ............ 280/5.506 |
| 4,128,259 A | 12/1978 | Trent |
| 4,484,767 A | 11/1984 | Klem |
| 4,648,620 A | 3/1987 | Nuss |
| 4,919,441 A | * 4/1990 | Marier et al. ............... 280/21.1 |
| 4,919,444 A | * 4/1990 | Leiber et al. ............. 280/5.511 |
| 5,098,119 A | 3/1992 | Williams et al. |
| 5,189,615 A | 2/1993 | Rubel et al. |
| 5,251,926 A | 10/1993 | Aulerich et al. |
| 5,324,056 A | 6/1994 | Orton |
| 5,527,061 A | 6/1996 | Karl |
| 5,826,687 A | 10/1998 | Büngeler et al. |
| 5,987,366 A | 11/1999 | Jun |
| 5,987,369 A | 11/1999 | Kwak et al. |
| 6,022,030 A | * 2/2000 | Fehring ................... 280/5.511 |
| 6,149,166 A | * 11/2000 | Struss et al. ............. 280/5.511 |

FOREIGN PATENT DOCUMENTS

JP 403231018 A * 10/1991 .......... 280/124.106

* cited by examiner

Primary Examiner—Anne Marie Boehler
Assistant Examiner—Faye M. Fleming
(74) Attorney, Agent, or Firm—Harness, Dickey & Pierce P.L.C.

(57) ABSTRACT

A stabilizer bar assembly for a vehicle having a pair of laterally-spaced wheels. The stabilizer bar assembly includes first and second stabilizer bar members and a clutch assembly. Each of the first and second stabilizer bar members is coupled to one of the pair of laterally-spaced wheels. The clutch assembly is coupled to the first and second stabilizer bar members and is operable in a first condition and a second condition. Operation of the clutch assembly in the first condition permits the first and second stabilizer bar members to rotate independently of one another so as to the stabilizer bar assembly from copying the motion of one of the wheels to the other one of the wheels. Operation of the clutch assembly in a second condition couples the first and second stabilizer bar members for rotation with one another, so as to reduce vehicle body roll.

22 Claims, 3 Drawing Sheets

SEMI-ACTIVE ANTI-ROLL SYSTEM

BACKGROUND OF THE INVENTION

1. Technical Field

The present invention generally relates to vehicle suspension systems and more particularly to a semi-active anti-roll suspension system having a pair of independently mounted stabilizer bar halves which may be coupled to one another to control vehicle roll.

2. Discussion

Traditional vehicle suspension systems include resilient devices, such as coil springs and leaf springs, to flexibly support a portion of a vehicle and enable all of the wheels to maintain contract with the ground when traversing uneven terrain. Segregating the vehicle into unsprung and sprung portions in this manner is also useful for preventing severe impulsive forces from being transmitted to the vehicle occupants.

It is known that when vehicle travels around a corner, centrifugal forces acting on the vehicle tend to cause the sprung portion of the vehicle to roll. In severe instances, the effects of roll can cause instability and impede the ability of the driver to control the vehicle. Although the effects of roll are more pronounced with vehicles having a comparatively high center of gravity, such as vans or trucks, every vehicle is effected by roll.

In tuning the ride and handling of a vehicle, it is often desirable to soften or lower the spring rate of the suspension's springs to provide a softer, less harsh ride. One of the main drawbacks associated with this approach is that a suspension system having springs with a relatively low spring rate permits the vehicle body to roll at a relatively higher rate. Accordingly, it would seem that the combination of springs with a very low spring rate and a relatively stiff stabilizer bar would optimize both the ride and handling of the vehicle.

The relatively stiff stabilizer bar, however, tends to directly connect the vehicle wheels such that the motion of one wheel is copied to another wheel. If a vehicle so equipped was to strike a bump with one wheel, for example, the upward force (i.e., jounce) imparted to that wheel would be transmitted through the stabilizer bar to the opposite wheel, causing the opposite wheel to move in an upward direction. This "cross-talk" between the vehicle wheels is highly undesirable as it adversely effects vehicle ride.

Another drawback of stabilizer bars is that their torsional stiffness inhibits the free travel of the vehicle wheels. Modern materials and design techniques have substantially reduced the weight of the vehicle wheels and mounting structures to such an extent that the weight of a wheel and its mounting structure is typically insufficient to cause the stabilizer bar to rotate. While this problem is rarely, if ever, noticed on the relatively flat surfaces of modern roads, it can become apparent when the vehicle is operated over un-even terrain. In some situations it is possible for one of the vehicle wheels to remain in an elevated position over a dip in the terrain due to the torsional resistance of the stabilizer bar. While situations of this severity are not routinely encountered, the fact remains that the stabilizer bar reduces vehicle traction in some situations.

Accordingly, there remains a need in the art for a suspension system having a stabilizer bar which reduces body roll while minimizing undesirable "cross-talk" between the vehicle wheels. There also remains a need in the art for a suspension system having a stabilizer bar which can be selectively controlled in a manner so that it does not affect vehicle traction.

SUMMARY OF THE INVENTION

In one form, the present invention provides a stabilizer bar assembly for a vehicle having a pair of laterally-spaced wheels. The stabilizer bar assembly includes first and second stabilizer bar members and a clutch assembly. Each of the first and second stabilizer bar members is coupled to one of the pair of laterally-spaced wheels. The clutch assembly is coupled to the first and second stabilizer bar members and is operable in a first condition and a second condition. Operation of the clutch assembly in the first condition permits the first and second stabilizer bar members to rotate independently of one another so as to the stabilizer bar assembly from copying the motion of one of the wheels to the other one of the wheels. Operation of the clutch assembly in a second condition couples the first and second stabilizer bar members for rotation with one another, so as to reduce vehicle body roll.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

Figure 1:
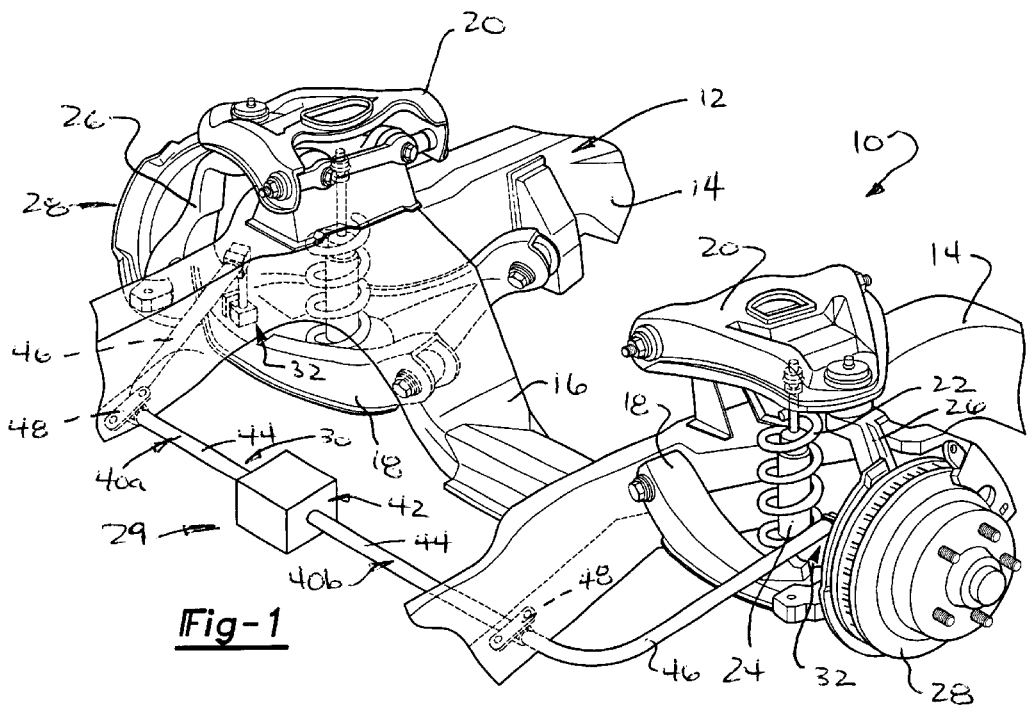
FIG. 1 is a perspective view of an exemplary independent front wheel suspension into which the stabilizer bar assembly of the present invention is incorporated.

With reference to FIG. 1 of the drawings, an exemplary independent front wheel suspension, generally indicated by reference numeral 10, of the type having suspension components at each wheel which are suspended from the vehicle frame. Reference will be made to a vehicle frame in the present disclosure, yet those skilled in the art will recognize that many current vehicles do not have a frame as such, but instead have regions of the body which act as an integrated frame structure. With this in mind, frame 12 is shown to partially include a pair of longitudinal side rails 14 and a crossbeam 16.

At each wheel, suspension 10 includes a lower control arm 18 and an upper control arm 20 which are both pivotally attached to frame 12. A strut assembly having a helical coil spring 22 and a strut damper 24 is retained between an intermediate portion of lower control arm 18 and frame 12 to support the weight of the vehicle body and any loads which are transmitted through lower control arm 18. Upper control arm 20 is connected to lower control arm 18 by a steering knuckle 26. A hub and rotor assembly 28 is rotatably attached to a spindle portion (not shown) of steering knuckle 26 such that a wheel and tire (also not shown) may be mounted thereon. Suspension system 10 further includes an anti-roll system 29 comprised of a stabilizer bar assembly 30 and a pair of end links 32 which connect the ends of stabilizer bar assembly 30 to lower control arms 18. Stabilizer bar assembly 30 is shown to include a pair of stabilizer bar members 40a, 40b and a clutch assembly 42. Each of the stabilizer bar members 40a, 40b is shown to be generally L-shaped having a central segment 44 which extends laterally across the vehicle and an arm segment 46 which extends longitudinally along the vehicle at the distal end of central segment 44. Each of the central segments 44 is rotatably attached to frame rails 14 by a mounting bracket 48. The opposite end of each arm segment 46 is connected to a corresponding one of the lower control arms 18 by one of the end links 32.

Figure 3:
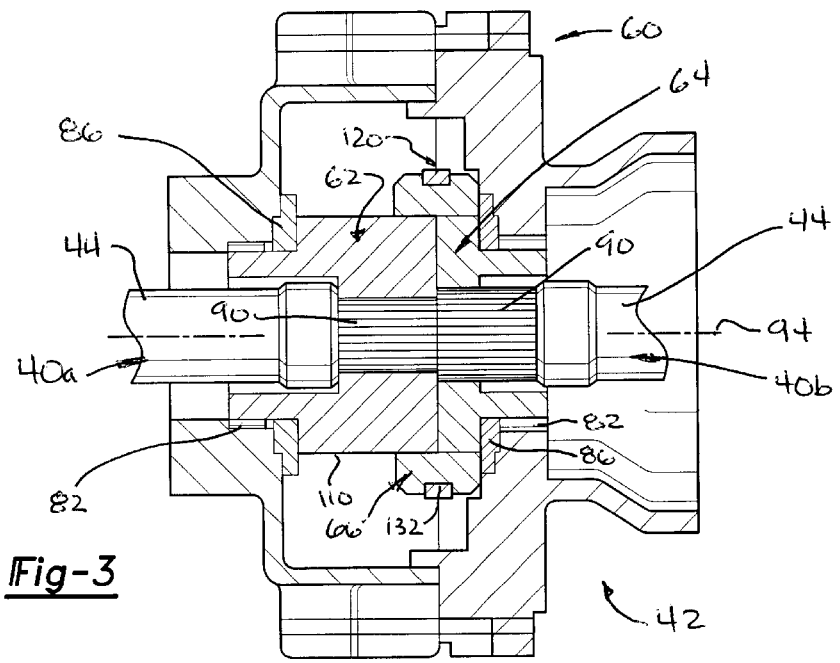
FIG. 3 is a longitudinal cross-section of a portion of the stabilizer bar assembly taken along the line 3—3.
Figure 2:
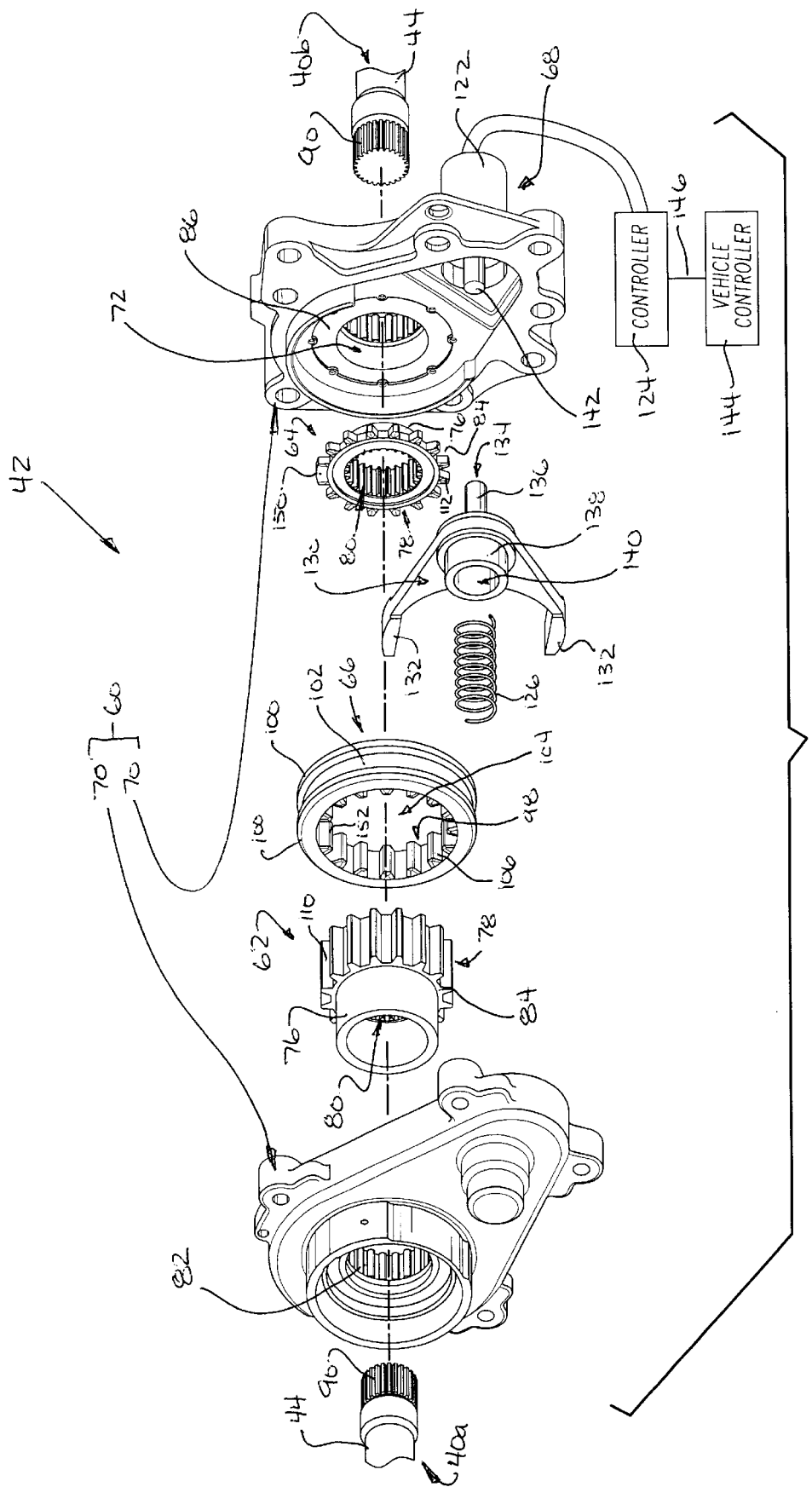
FIG. 2 is an exploded perspective view of the stabilizer bar assembly of FIG. 1.

In FIGS. 2 and 3, the exemplary clutch assembly 42 provided is illustrated to include a housing assembly 60, first and second gear members 62 and 64, respectively, a coupling member 66 and an actuator assembly 68. Housing assembly 60 includes a pair of housing members 70 which cooperate to define a central cavity 72 into which the central segments 44 of the stabilizer bar members 40a, 40b are received.

First and second gear members 62 and 64 are illustrated to include a journal portion 76, an external gear portion 78 and an internal spline portion 80. Journal portion 76 is supported for rotation by an associated bearing 82 in central cavity 72. The outer face 84 of each external gear portion 78 sized to engage an associated thrust washer 86 disposed between the housing member 70 and the external gear portion 78 to prevent contact therebetween. Internal spline portion 80 is sized to receive an external spline portion 90 formed into the proximal end of a corresponding one of the stabilizer bar members 40a, 40b. Meshing engagement of the external spline portion 90 of stabilizer bar member 40a and the internal spline portion 80 of first gear member 62 couples stabilizer bar member 40a and first gear member 62 for rotation about the of stabilizer bar members 40a, 40b. Likewise, meshing engagement of the external spline portion 90 of stabilizer bar member 40b and the internal spline portion 80 of second gear member 64 couples stabilizer bar member 40b and second gear member 64 for rotation about rotational axis 94

Coupling member 66 is show n to include an internal gear portion 78 and a pair of annular flanges 100 which cooperate to define a clutch fork groove 102. Internal spline portion 80 includes an aperture 104 that defines a plurality of gear teeth 106. Aperture 104 is configured in a manner which is complementary to first gear member 62 such that the gear teeth 106 of coupling member 66 meshingly engage the gear teeth 110 of first gear member 62. Configuration in this manner permits coupling member 66 to slide along rotational axis 94 while remaining in meshing engagement with first gear member 62. Coupling member 66 may be slid along first gear member 62 and into meshing engagement with second gear member 64. The teeth 106 and 112 of coupling member 66 and second gear member 64, respectively, are chamfered to improve the ability with which they meshingly engage.

The position of coupling member 66 along rotational axis 94 is controlled by actuator assembly 68. In the embodiment illustrated, actuator assembly 68 is shown to include a clutch fork 120, an actuator device 122, a controller 124 and a spring 126. Clutch fork 120 includes a generally U-shaped body portion 130 having a pair of arms 132 which are disposed within clutch fork groove 102. A pin member 134 intersects the body portion 130. A first portion 136 of the pin member 134 is disposed in cavity 72. A second portion 138 of pine member 134 includes a bore 140 that is sized to receive spring 126.

Actuator device 122 includes a positionable actuator member 142 which contacts the first portion 136 of pin member 134 and may be selectively positioned between a first actuator position and a second actuator position. Controller 124 is operable for generating an actuator signal which is received by actuator device 122. In its most basic form, actuator signal is a discreet signal that toggles between two predetermined values (e.g., 0 and 1) which are indicative of the desired actuator position. Upon receipt of an actuator signal, actuator device 122 repositions actuator member 142 as necessary to affect the position of clutch fork 120. Placement of actuator member 142 in the first actuator position causes clutch fork 120 to slide coupling member 66 away from and out of meshing engagement with second gear member 64. Operation of stabilizer bar assembly 29 in this manner effectively de-couples stabilizer bar members 40a and 40b such that they are permitted to rotate independently of one another about rotational axis 94. Placement of actuator member 142 in the second actuator position causes clutch fork 120 to slide coupling member 66 toward and into meshing engagement with second gear member 64. Operation of stabilizer bar assembly 29 in this manner effectively couples stabilizer bar members 40a and 40b such that they are coupled for common rotation about rotational axis 94. Those skilled in the art will understand that coupling of stabilizer bar members 40a and 40b in this manner will permit the transmission of torque therebetween which resists the roll of a vehicle body (not shown).

Preferably, controller 124 is coupled to a vehicle controller 144 via a data bus 146, thereby providing controller 124 with various vehicle data, such as the vehicle speed and an actively engaged transmission ratio. Configuration in this manner is advantageous in that controller 124 may then be employed to automatically position coupling member 66 in a desired position in response to a predetermined set of vehicle data. For example, upon the detection of a vehicle speed in excess of a predetermined amount, controller 124 may be programmed to generate the actuator signal to cause clutch fork 120 to slide coupling member 66 into meshing engagement with second gear member 64. Similarly, controller 124 may be programmed to cause clutch fork 120 so slide coupling member 66 out of engagement with second gear member 64 if a predetermined gear ratio has been engaged (e.g., four-wheel drive, low gear) and the vehicle speed is less than a predetermined amount.

Spring 126 provides a degree of compliance in the positioning of clutch fork 120 to prevent damage to clutch assembly 42 in situations where coupling member 66 cannot be immediately engaged to or disengaged from second gear member 64. If, for example, coupling member 66 cannot engage second gear member 64 simultaneously with the movement of actuator member 142 into the second actuator position, spring 126 is compressed between housing 70 and body portion 130. The force generated by the compression of spring 126 is exerted onto clutch fork 120 and tends to push coupling member 66 into meshing engagement with second gear member 64 at an appropriate time (e.g., when the rotational speed and/or alignment of coupling member 66 and second gear member 64 are consistent).

Figure 4:
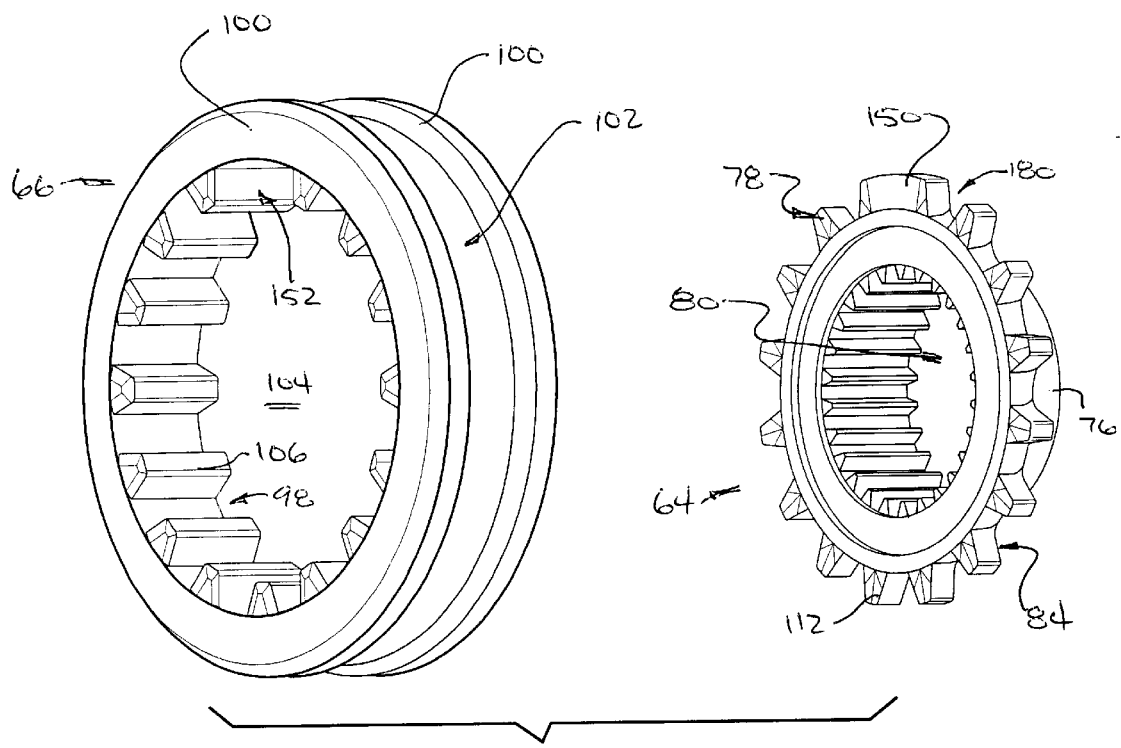
FIG. 4 is a front elevational view of a portion of the clutch assembly illustrating the coupling member and the second gear member in greater detail.

Preferably, coupling member 66 and second gear member 64 are configured such that they can only be meshingly engaged when stabilizer bar members 40a and 40b are in a predetermined orientation. Methods for keying the orientation of one shaft to another are commonly known in the art and need not be discussed in detail herein. In the example provided, stabilizer bar members 40a and 40b are keyed to one another via a blocking tooth 150 and a blocking slot 152 which are shown in greater detail in FIG. 4. Blocking tooth 150 is formed, for example, in second gear member 64 and has a shape which is relatively wider than the other teeth 112 of second gear member 64. Blocking slot 152 is formed in coupling member 66 and configured to receive blocking tooth 150. Blocking tooth 150 and blocking slot 152 cooperate to prevent the engagement of coupling member 66 to second gear member 64 unless blocking tooth 150 and blocking slot 152 are aligned to one another. Those skilled in the art will understand that in the alternative, blocking tooth 150 may be formed into coupling member 66 and blocking tooth 150 may be formed into second gear member 64.

Also preferably, clutch assembly 42 also includes a de-lashing mechanism 180 (FIG. 4) for removing the gear lash between the first and second gear members 62 and 64 and the coupling member 66. Such de-lashing mechanisms are well known in the art and need not be discussed in detail. In the particular embodiment illustrated, a portion of the teeth 112 of the second gear member 64 are formed on a helix so that the second gear member 64 will rotate about the rotational axis 94 in response to meshing engagement with coupling member 66 to cause the teeth 106 of the coupling member 66 to contact the teeth 112 of the second gear member 64. Those skilled in the art will understand that the rotational motion of the second gear member 64 will also cause coupling member 66 to rotate relative to the first gear member 62 to cause their teeth 106 and 110, respectively, to contact one another.

Figure 5:
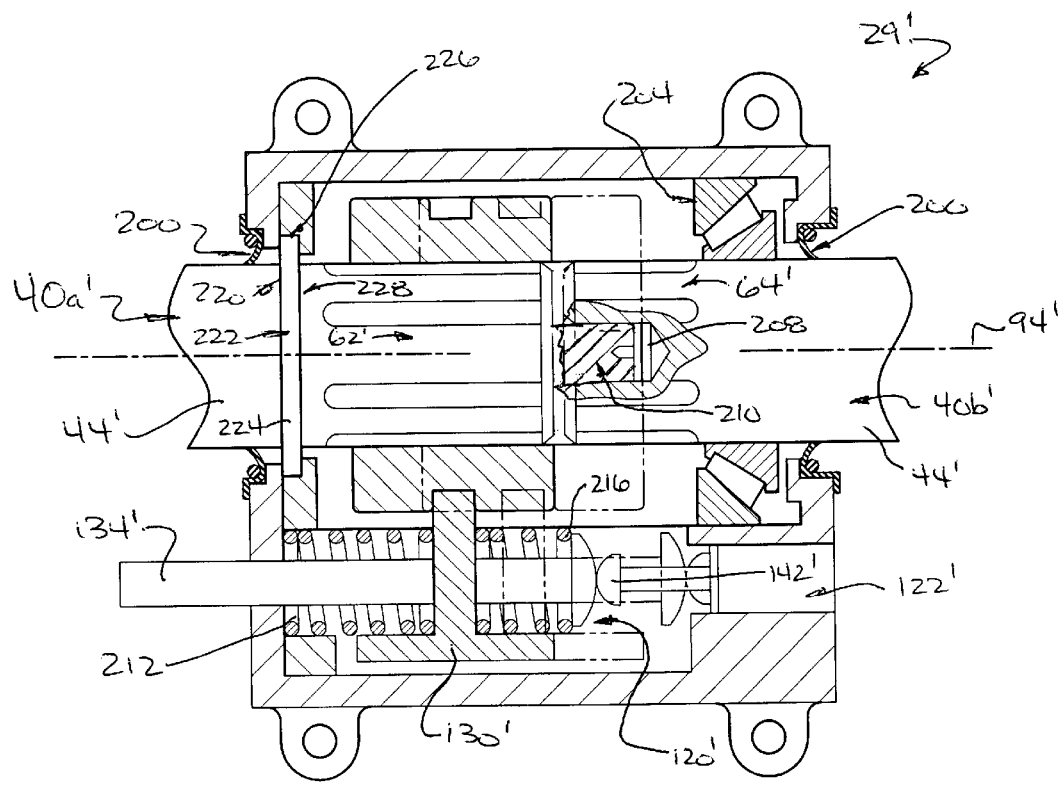
FIG. 5 is a longitudinal cross-section similar to that of FIG. 3 but illustrating an alternately constructed clutch assembly.

In FIG. 5, an alternately constructed stabilizer bar assembly 29' is illustrated. A pair of seals 200 sealing engage the central segments 44' of stabilizer bar members 40a' and 40b'. First gear member 62' is illustrated to be fixedly coupled to the proximal end of stabilizer bar member 40a' and second gear member 64' is illustrated to be fixedly coupled to the proximal end of stabilizer bar member 40b'. Stabilizer bar member 40b' is supported by bearing 204 for rotation within housing assembly 60'. Stabilizer bar member 40b' is illustrated to include a pilot aperture 208 which is configured to receive a pilot portion 210 that is coupled to stabilizer bar member 40a'. Pilot aperture 208 and pilot portion 210 cooperate to align stabilizer bar members 40a' and 40b' about rotational axis 94'.

Clutch fork 120' is illustrated to include a unitarily formed body portion 130' and a unitarily formed pin member 134'. Pin member 134' extends through an aperture (not specifically shown) formed into body portion 130' and is slidable along an axis that is generally parallel rotational axis 94'. First and second spring members 212 and 216, respectively, are disposed about pin member 134' and spaced axially apart by body portion 130'. Actuator device 122' is constructed such that actuator member 142' is normally maintained in the second actuator position. As first spring 212 has a spring rate that is relatively larger than that of second spring 216, the force generated by first spring 212 will be applied to body portion 130' such that coupling member 66 is normally maintained in a condition wherein it is engaged with second gear member 64' (i.e., clutch assembly 42' is normally maintained in the second condition which is indicated in phantom).

Upon the receipt of an actuator signal indicative of the desire to shift actuator member 142' to the second actuator position, actuator device 122' will extend actuator member 142' to contact pin member 134', causing pin member 134' to translate relative to body portion 130' and compress second spring 216. In this condition, the force generated by second spring 216 exceeds the biasing force that is exerted by the first spring 212, causing body portion 130' to slide axially and disengage coupling member 66 from second gear member 64'. In this arrangement, if the actuator signal is lost (e.g., in the event of a power failure), actuator device 122' will not maintain actuator member 142' in the first actuator position, thereby permitting the biasing force of first spring 212 to shift body portion 130' so that coupling member 66 engages second gear member 64'.

Stabilizer bar assembly 29' is also shown to include a stop device 220 which is coupled to stabilizer bar member 40a'. Stop device 220 includes a stop member 222 that is operable for restraining stabilizer bar member 40a' from moving axially along rotational axis 94' by an amount that exceeds a predetermined amount. In the particular embodiment illustrated, stop member 222 is a retaining ring 224 which is coupled to stabilizer bar member 40a', the retaining ring 224 being disposed in a pair of retaining ring grooves 226 and 228 formed in the housing assembly 60' and the stabilizer bar member 40a', respectively, in a manner that is well known in the art.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A stabilizer bar assembly for a vehicle having a pair of laterally-spaced wheels, the stabilizer bar assembly comprising:

a first stabilizer bar member adapted to be coupled to a first one of the pair of laterally-spaced wheels;

a second stabilizer bar member adapted to be coupled to a second one of the pair of laterally-spaced wheels; and a clutch assembly coupled to the first and second stabilizer bar members, the clutch assembly operable in a first condition wherein the first and second stabilizer bar members are permitted to rotate independently of one another and the clutch assembly operable in a second condition where the first and second stabilizer bar members coupled for rotation with one another;

wherein the clutch assembly includes a first gear member, a second gear member and a coupling member, the first gear member being coupled for rotation with the first stabilizer bar member, the second gear member being coupled for rotation with the second stabilizer bar member, the coupling member selectively positionable between a disengaged position and an engaged position wherein the coupling member is in meshing engagement with the first and second gear members.

2. The stabilizer bar assembly of claim 1, wherein the coupling member includes an aperture that defines a plurality of internal gear teeth that meshingly engage a plurality of external gear teeth formed into a portion of the second gear member when the coupling member is positioned in the engaged position.

3. The stabilizer bar assembly of claim 2, wherein the plurality of internal gear teeth are in sliding engagement with a plurality of external gear teeth formed into the first gear member.

4. The stabilizer bar assembly of claim 2, wherein a first one of the plurality of internal teeth and the plurality of external teeth includes a blocking tooth and the other one of the plurality of internal teeth and the plurality of external teeth includes a blocking slot configured to receive the blocking tooth, the blocking tooth and the blocking slot being positioned to prevent the internal gear teeth from meshingly engaging the external gear teeth if the first and second stabilizer bar members are not in a predetermined position.

5. The stabilizer bar assembly of claim 1, wherein each of the first and second stabilizer bar members is generally L-shaped.

6. The stabilizer bar assembly of claim 1, wherein the clutch assembly is biased in the second condition.

7. The stabilizer bar assembly of claim 1, wherein the clutch assembly is further operable in a third condition wherein the clutch assembly is operable for limiting an amount of torque transmitted between the first and second stabilizer bar members to a predetermined torque.

8. The stabilizer bar assembly of claim 7, wherein the stabilizer bar assembly further includes a controller coupled to the clutch assembly and operable for controlling a magnitude of the predetermined torque.

9. The stabilizer bar assembly of claim 1, wherein the stabilizer bar assembly further includes a stop device coupled to one of the first and second stabilizer bar members, the stop device including a stop member which restrains the one of the first and second stabilizer bar members from moving axially along a rotational axis of the first and second stabilizer bar members by an amount that exceeds a predetermined amount.

10. The stabilizer bar assembly of claim 9, wherein the clutch assembly includes a housing and the stop member is a retaining ring that is configured to cooperate with a ring groove formed into the housing.

11. A stabilizer bar assembly for a vehicle having a pair of laterally-spaced wheels, the stabilizer bar assembly comprising:
a first stabilizer bar member adapted to be coupled to a first one of the pair of laterally-spaced wheels;
a second stabilizer bar member adapted to be coupled to a second one of the pair of laterally-spaced wheels; and
a clutch assembly coupled to the first and second stabilizer bar members, the clutch assembly operable in a first condition wherein the first and second stabilizer bar members are permitted to rotate independently of one another and the clutch assembly operable in a second condition where the first and second stabilizer bar members coupled for rotation with one another;
wherein a first one of the first and second stabilizer bar members includes a pilot aperture configured to receive a pilot portion coupled to the other one of the first and second stabilizer bar members, the pilot aperture and pilot portion cooperating to align the first and second stabilizer bar members about a rotational axis.

12. A vehicle comprising:
a pair of laterally-spaced wheels;
a first stabilizer bar member coupled to a first one of the pair of laterally-spaced wheels;
a second stabilizer bar member coupled to a second one of the pair of laterally-spaced wheels; and
a clutch assembly coupled to the first and second stabilizer bar members, the clutch assembly operable in a first condition wherein the first and second stabilizer bar members are permitted to rotate independently of one another and the clutch assembly operable in a second condition where the first and second stabilizer bar members coupled for rotation with one another;
wherein the clutch assembly includes a first gear member, a second gear member and a coupling member, the first gear member being coupled for rotation with the first stabilizer bar member, the second gear member being coupled for rotation with the second stabilizer bar member, the coupling member selectively positionable between a disengaged position and an engaged position wherein the coupling member is in meshing engagement with the first and second gear members.

13. The vehicle of claim 12, wherein the coupling member includes an aperture that defines a plurality of internal gear teeth that meshingly engage a plurality of external gear teeth formed into a portion of the second gear member when the coupling member is positioned in the engaged position.

14. The vehicle of claim 13, wherein the plurality of internal gear teeth are in sliding engagement with a plurality of external gear teeth formed into the first gear member.

15. The vehicle of claim 13, wherein a first one of the plurality of internal teeth and the plurality of external teeth includes a blocking tooth and the other one of the plurality of internal teeth and the plurality of external teeth includes a blocking slot configured to receive the blocking tooth, the blocking tooth and the blocking slot being positioned to prevent the internal gear teeth from meshingly engaging the external gear teeth if the first and second stabilizer bar members are not in a predetermined position.

16. The vehicle of claim 12, wherein each of the first and second stabilizer bar members is generally L-shaped.

17. The vehicle of claim 12, wherein the clutch assembly is biased in the second condition.

18. The vehicle of claim 12, wherein the clutch assembly is further operable in a third condition wherein the clutch assembly is operable for limiting an amount of torque transmitted between the first and second stabilizer bar members to a predetermined torque.

19. The vehicle of claim 18, wherein the vehicle further includes a controller coupled to the clutch assembly and operable for controlling a magnitude of the predetermined torque.

20. The vehicle of claim 12, wherein the stabilizer bar assembly further includes a stop device coupled to one of the first and second stabilizer bar members, the stop device including a stop member which restrains the one of the first and second stabilizer bar members from moving axially along a rotational axis of the first and second stabilizer bar members by an amount that exceeds a predetermined amount.

21. The vehicle of claim 20, wherein the clutch assembly includes a housing and the stop member is a retaining ring that is configured to cooperate with a ring groove formed into the housing.

22. A vehicle comprising:
a pair of laterally-spaced wheels;
a first stabilizer bar member coupled to a first one of the pair of laterally-spaced wheels;

a second stabilizer bar member coupled to a second one of the pair of laterally-spaced wheels; and a clutch assembly coupled to the first and second stabilizer bar members, the clutch assembly operable in a first condition wherein the first and second stabilizer bar members are permitted to rotate independently of one another and the clutch assembly operable in a second condition where the first and second stabilizer bar members coupled for rotation with one another;

wherein a first one of the first and second stabilizer bar members includes a pilot aperture configured to receive a pilot portion coupled to the other one of the first and second stabilizer bar members, the pilot aperture and pilot portion cooperating to align the first and second stabilizer bar members about a rotational axis.

* * * * *